United States Patent

[15] 3,658,659

Cottle

[45] Apr. 25, 1972

[54] SEPARATING P-DICHLOROBENZENE FROM N-METHYL PYRROLIDONE BY STEAM DISTILLATION

[72] Inventor: John E. Cottle, Bartlesville, Okla.

[73] Assignee: Phillips Petroleum Company

[22] Filed: Sept. 24, 1969

[21] Appl. No.: 860,811

[52] U.S. Cl..................................203/76, 203/77, 203/79, 203/80, 203/85, 203/96, 260/79.1, 260/326.5
[51] Int. Cl..........................................................B01d 3/38
[58] Field of Search..................203/15, 29, 67, 71, 88, 94, 203/96, 99; 252/33.6, 42, 42.1, 63.7; 260/37, 30.2, 46.5, 79, 79.1, 79.3, 629, 669; 208/324

[56] References Cited

UNITED STATES PATENTS

| 2,476,205 | 7/1949 | McCants | 203/67 X |
| 2,868,696 | 1/1959 | Skinner | 203/99 |
| 3,354,129 | 11/1967 | Edmonds et al. | 252/63.7 X |
| 3,451,925 | 6/1969 | Morris et al. | 208/324 |
| 3,502,547 | 3/1970 | Bridgeford | 203/71 |
| 3,522,153 | 7/1970 | King | 203/99 X |
| 3,248,325 | 4/1966 | Graham | 260/79.1 |
| 3,478,000 | 11/1969 | Saunders et al. | 260/79.1 |

FOREIGN PATENTS OR APPLICATIONS 385,980 1/1933 Great Britain........................260/79.1

Primary Examiner—Norman Yudkoff
Assistant Examiner—David Edwards
Attorney—Young and Quigg

[57] ABSTRACT

A process for the recovery of p-dichlorobenzene and N-methylpyrrolidone from the reactor effluent from the production of polyphenylene sulfide from which the polyphenylene sulfide has been separated involving a steam distillation step to recover the p-dichlorobenzene and a fractionation step to recover the N-methylpyrrodone.

10 Claims, 1 Drawing Figure

Patented April 25, 1972
3,658,659
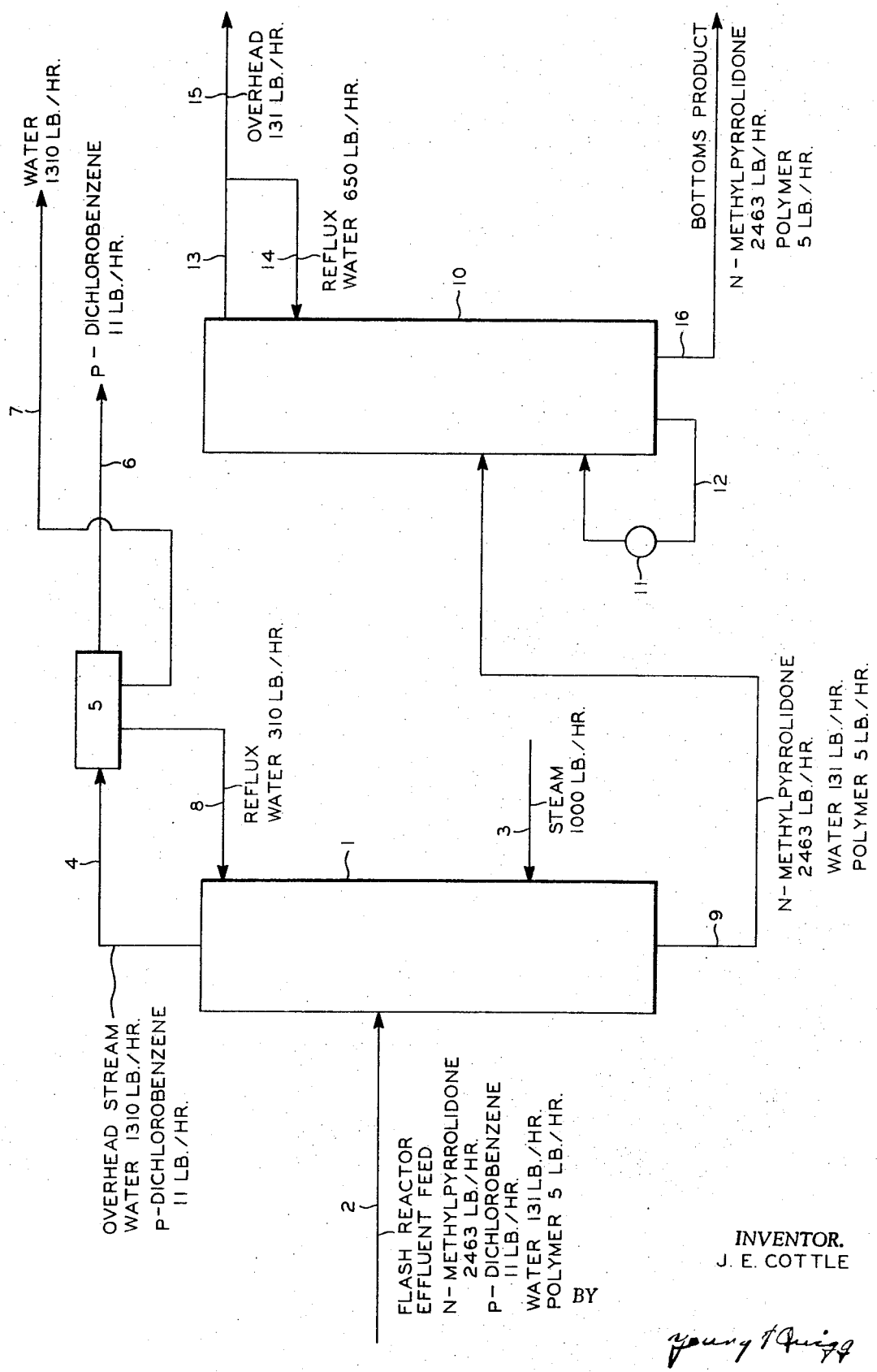
INVENTOR.
J. E. COTTLE
BY
*Young & Quigg*
ATTORNEYS

SEPARATING P-DICHLOROBENZENE FROM N-METHYL PYRROLIDONE BY STEAM DISTILLATION

This invention relates to the recovery of arylene sulfide polymers.

In one of its more specific aspects, this invention relates to the purification of the solvent recycled to the reaction zone in the production of polyphenylene sulfide.

The production of polyphenylene sulfide is well known. As disclosed in U.S. Pat. No. 3,354,129 to Edmonds et al., one of the methods for its production involves reacting p-dichlorobenzene with sodium sulfide in N-methylpyrrolidone.

From the reaction zone, there is recovered a mixture of water, p-dichlorobenzene, N-methylpyrrolidone, sodium chloride, low molecular weight dissolved solids and the polyphenylene sulfide. It is conventional to flash this reactor effluent to yield an overhead product comprised substantially of water, p-dichlorobenzene, N-methylpyrrolidone, and a residual product comprised substantially of polyphenylsulfide, sodium chloride and dissolved solids.

Inasmuch as some of the N-methylpyrrolidone and p-dichlorobenzene from the flashed overhead are recycled to the polymerization zone, it is desirable to separate these overhead components while retaining therein a minimum of water.

The method of this invention is directed to such separation of these recycle components.

According to the method this invention, there is provided a process for the recovery of p-dichlorobenzene and N-methylpyrrolidone from the flashed overhead from the production of polyphenylene sulfide which comprises steam distilling the overhead to recover a combined p-dichlorobenzene and water cut and a bottoms cut, recovering the p-dichlorobenzene from the overhead cut and fractionating the bottoms cut to recover the N-methylpyrrolidone.

The method of this invention can be carried out either in a batchwise or in a continuous process.

If carried out in a batchwise manner, separation of the water and p-dichlorobenzene from the reactor effluent is made by distillation, after which, without removing the residual portion to a separate fraction zone, the residual portion is further fractionated within definite temperatures to separate the balance of the water from the N-methylpyrrolidone which, in turn, is fractionated from the bottoms product.

The invention will be described in terms of the continuous method, without, however, meaning to limit the invention thereto and in that embodiment illustrated in the attached FIGURE.

The method of this invention contemplates first separation which employs steam distillation to separate overhead from the flashed reactor effluent the principal portion of the p-dichlorobenzene and a substantial quantity of that water which is contained in the flashed reactor effluent.

The flashed reactor effluent can vary in respect to its components over wide ranges. A typical analysis can be as follows:

| Component | Lb./Hr. | Weight % |
|---|---|---|
| N-methylpyrrolidone | 2463 | 94.4 |
| p-Dichlorobenzene | 11 | 0.4 |
| Water | 131 | 5.0 |
| Polymer | 5 | 0.2 |
| Total: | 2610 | |

By subjecting this mixture to steam distillation, there will be taken overhead a mixture of water and p-dichlorobenzene, this mixture having the approximate composition of about 11 lb. of p-dichlorobenzene and about 1,300 lb. of water, and there will be left as kettle residue a substantially p-dichlorobenzene-free material.

Separation of the p-dichlorobenzene and water from the N-methylpyrrolidone and polymer is accomplished by introducing the flashed material from the reactor into a fractionation zone maintained at a pressure of about 5 psig. The introduction temperature of this feed stream is about 100° F. A bottoms tower temperature of about 310° F. is maintained by employing a conventional reboiler through which tower bottoms are circulated. Steam, saturated at about 225° F., is introduced into the bottom of the tower at the rate of about 1000 lb./hr., or at the rate of about 90–120 lb. per pound of p-dichlorobenzene to be taken overhead, this steam being produced by recirculating the overhead water product through a heater or being added from an extraneous source.

Overhead from the tower at a top tower temperature of about 215° F. consists of a mixture comprising about 1310 lb./hr. of steam and about 11 lb./hr. of p-dichlorobenzene. About 310 lb./hr. of water are returned to the top of the tower at about 150° F. as reflux. The p-dichlorobenzene is substantially immiscible with water and is separated by gravity settling in either the reflux accumulator or in a separate tank and a p-dichlorobenzene product suitable for recycling to the polymerization process is obtained. The bottoms stream is removed from the initial fractionation zone and introduced into a second fractionation zone. Analyses around this initial fractionation zone are as follows:

| Streams Composition, lb./hr. | Overhead | Reflux | p-Dichlorobenzene Product | Bottoms Product |
|---|---|---|---|---|
| N-methylpyrrolidone | | | | 2463 |
| p-Dichlorobenzene | 11 | 0 | 11 | 0 |
| Water | 1310 | 310 | Trace | 131 |
| Polymer | | | | 5 |

The bottoms stream is introduced into the second fractionation zone maintained at about 5 psig. By circulating some portion of its bottoms through a reboiler, the bottoms tower temperature is maintained at a temperature of about 400° F. and its top tower temperature is maintained at a temperature of about 215° F.

Overhead from the second fractionator consists of about 781 lb./hr. of a cut comprising substantially water, of which about 650 lb./hr. are refluxed to the tower at about 150° F., the balance being sent to disposal. The N-methylpyrrolidone is recovered as the bottoms product from the second fractionation zone.

Analyses around this second fractionation zone are as follows:

| Streams lb./hr. | Overhead | Reflux | Overhead Product | Bottoms Product |
|---|---|---|---|---|
| N-methylpyrrolidone | — | — | — | 2463 |
| Water | 781 | 650 | 131 | — |
| Polymer | — | — | — | 5 |

The invention, assuming the above material balance, is shown in the attached figure in which the charge stream is introduced into the first fractionation zone 1 through conduit 2 with steam being introduced into the zone through conduit 3.

The stream taken overhead through conduit 4 is separated in separation zone 5 into overhead product streams 6 and 7 and into reflux stream 8.

The bottoms stream taken through conduit 9 is introduced into the second fractionator 10 with a portion being circulated through reboiler 11 through conduit 12.

A portion of the overhead stream taken through conduit 13 is returned as reflux through conduit 14 while the overhead product is recovered through conduit 15 and the bottoms product through conduit 16.

In the practice of this invention, smaller or larger amounts of the various components may be present without effecting appreciably the conditions stated. For example, the quantity of polymer greater than that shown may be advantageously present to provide a larger working volume in the bottom of the second fractionation zone. Or, if desired, some quantity of heavy material may be introduced into the second fractionation zone to provide such a working volume.

While a considerable latitude in operating conditions is possible, it is desirable that from the first fractionating zone the overhead not be cooled to less than about 135° F. inasmuch as the p-dichlorobenzene tends to solidify at about 128° F. and cooling to too low a temperature tends to foul the overhead condenser surfaces.

In the second fractionation zone, the fractionation is preferably carried out at low pressures, preferably at less than atmospheric to minimize the decomposition of N-methylpyrrolidone and polymers as they are recycled through the reboiler.

It will be evident from the above that various modifications can be made to the method of this invention. Such, however, are considered as being within the scope of the invention.

What is claimed is:

1. A process for the recovery of p-dichlorobenzene and N-methylpyrrolidone from the reactor effluent from the production of polyphenylene sulfide which effluent comprises substantially water, p-dichlorobenzene and N-methylpyrrolidone, which comprises steam distilling said effluent to produce an overhead product comprising substantially water and p-dichlorobenzene and a bottoms product comprising substantially N-methylpyrrolidone and water, recovering said p-dichlorobenzene and fractionating said bottoms product to recover N-methylpyrrolidone.

2. The process as defined in claim 1 in which said steam distilling is conducted at a pressure of about 5 psig and a bottoms tower temperature of about 310° F.

3. The process as defined in claim 1 in which steam is introduced into said steam distilling step at the rate of from about 90 to about 120 pounds per pound of p-dichlorobenzene recovered.

4. The process as defined in claim 1 in which said bottoms product is fractionated at a pressure of about 5 psig and a bottoms tower temperature of about 400° F.

5. The process of claim 1 in which said overhead product comprises said steam and said p-dichlorobenzene in a weight ratio of about 1310 lb./hr. steam and about 11 lb./hr. of p-dichlorobenzene.

6. The process of claim 5 in which said steam and said p-dichlorobenzene are cooled to condense said steam to water and said water and said p-dichlorobenzene are separated.

7. The process of claim 4 in which said bottoms product is fractionated to produce an overhead product comprising substantially water and a bottoms product comprising N-methylpyrrolidone and polymer.

8. The process of claim 7 in which said bottoms product comprises N-methylpyrrolidone and polymer in a weight ratio of from about 2463 pounds of N-methylpyrrolidone and about 5 pounds of polymer.

9. The method of claim 7 in which a quantity of material is introduced into said fractionation to provide a working volume in said fractionation.

10. The method of claim 6 in which said mixture is cooled to a temperature of not less than about 135° F.

* * * * *